(12) United States Patent
Dehmel

(10) Patent No.: US 9,707,977 B2
(45) Date of Patent: Jul. 18, 2017

(54) SYSTEM, METHOD AND RAILWAY CARRIAGE FOR THE RAIL-BOUND TRANSPORTATION OF OBJECTS

(75) Inventor: Wolfram Peter Dehmel, Passau (DE)

(73) Assignee: K & K MASCHINENENTWICKLUNGS GMBH & CO. KG, München (DE)

( * ) Notice: Subject to any disclaimer, the term of this patent is extended or adjusted under 35 U.S.C. 154(b) by 579 days.

(21) Appl. No.: 14/118,131

(22) PCT Filed: May 15, 2012

(86) PCT No.: PCT/EP2012/059032
§ 371 (c)(1),
(2), (4) Date: Jan. 17, 2014

(87) PCT Pub. No.: WO2012/156408
PCT Pub. Date: Nov. 22, 2012

(65) Prior Publication Data
US 2014/0123871 A1  May 8, 2014

(30) Foreign Application Priority Data

May 16, 2011 (DE) .......... 10 2011 101 636
Dec. 23, 2011 (DE) .......... 20 2011 109 502 U
Mar. 15, 2012 (DE) .......... 10 2012 005 287

(51) Int. Cl.
*B61D 15/00* (2006.01)
*B61D 3/18* (2006.01)
(Continued)

(52) U.S. Cl.
CPC ............... *B61D 15/00* (2013.01); *B61D 1/00* (2013.01); *B61D 3/18* (2013.01); *B61D 47/00* (2013.01); *Y02T 30/30* (2013.01)

(58) Field of Classification Search
CPC ......... B61D 15/00; E01B 27/00; E01B 29/00; E01B 37/00
(Continued)

(56) References Cited

U.S. PATENT DOCUMENTS 2,669,894 A    2/1954  Kassel
3,680,486 A *  8/1972  Plasser .................... E01B 31/00
                                                        104/12
(Continued)

FOREIGN PATENT DOCUMENTS

CN          1114114 A      12/1995
CN         101061028 A     10/2007
(Continued)

OTHER PUBLICATIONS

Article "Schotterbettreinigung" by DR.-ING. Rosemarie Schilling, ZEVrail Glasers Annalen 129, (Oct. 10, 2005). English abstract.

*Primary Examiner* — Zachary Kuhfuss

(57) ABSTRACT

The invention relates to a system and method for the rail-bound transportation of objects, e.g. for delivering or collecting material to and/or from railway working vehicles, comprising several interconnected railway carriages (1), which respectively comprise at least one conveyor track (6, 7) on which the objects can be driven in a longitudinal manner in relation to the railway carriages (1) and which are designed such that the conveyor tracks (6, 7) join together the interconnected railway carriages (1). According to the invention, said system comprises conveyor bodies (8) for the objects, said bodies being designed to move from one railway carriage (1) to another railway carriage (1) along the conveyor tracks (6, 7) which are connected one to the other. The invention also relates to suitable railway carriages therefor.

6 Claims, 1 Drawing Sheet

Figure 1:
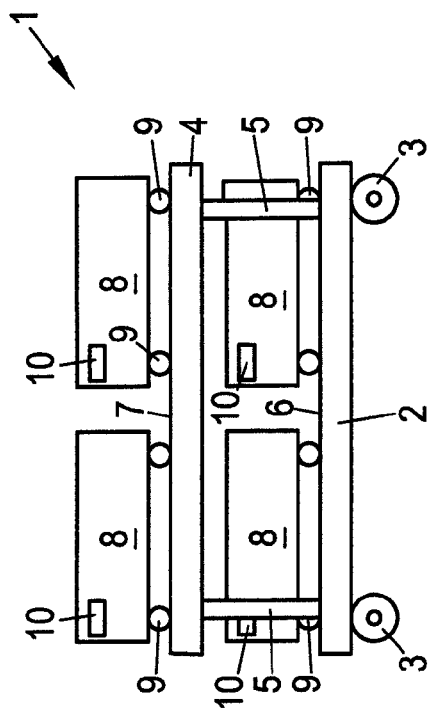

(51) Int. Cl.
*B61D 47/00* (2006.01)
*B61D 1/00* (2006.01)

(58) Field of Classification Search
USPC .................................................. 104/2, 4, 5
See application file for complete search history.

(56) References Cited

U.S. PATENT DOCUMENTS

| | | | | |
|---|---|---|---|---|
| 4,000,699 A | * | 1/1977 | Scheuchzer | E01B 29/05 104/137 |
| 4,152,989 A | * | 5/1979 | Theurer | E01B 27/08 104/2 |
| 4,160,418 A | * | 7/1979 | Theurer | E01B 29/00 104/2 |
| 4,261,264 A | * | 4/1981 | Theurer | E01B 29/06 104/2 |
| 4,267,777 A | | 5/1981 | Theurer et al. | |
| 4,275,659 A | | 6/1981 | Theurer et al. | |
| 4,794,861 A | * | 1/1989 | Theurer | E01B 29/10 104/137 |
| 4,809,614 A | * | 3/1989 | Theurer | E01B 29/10 104/12 |
| 4,911,599 A | * | 3/1990 | Theurer | E01B 29/10 104/5 |
| 4,955,302 A | * | 9/1990 | Theurer | E01B 29/10 104/7.2 |
| 5,151,002 A | * | 9/1992 | Theurer | E01B 27/00 414/339 |
| 5,609,106 A | * | 3/1997 | Aubermann | E01B 29/05 104/5 |
| 5,904,098 A | * | 5/1999 | Theurer | E01B 29/06 104/2 |
| 6,089,162 A | * | 7/2000 | Madison | E01B 29/10 104/2 |
| 6,112,670 A | * | 9/2000 | Miller | E01B 29/06 104/12 |
| 6,170,401 B1 | * | 1/2001 | Miller | E01B 29/09 104/12 |
| 2003/0205162 A1 | * | 11/2003 | Herzog | E01B 27/00 104/2 |
| 2009/0008106 A1 | | 1/2009 | Rossanigo | |

FOREIGN PATENT DOCUMENTS

| | | |
|---|---|---|
| DE | 960 288 B | 3/1957 |
| DE | 2 065 989 A1 | 9/1977 |
| DE | 27 13 634 A1 | 12/1977 |
| DE | 29 09 721 A1 | 12/1979 |
| DE | 29 13 639 A1 | 3/1980 |
| DE | 32 28 015 A1 | 7/1983 |
| DE | 42 13 925 A1 | 8/1993 |
| DE | 196 50 443 A1 | 7/1997 |
| DE | 196 37 218 A1 | 3/1998 |
| DE | 298 20 833 U1 | 1/1999 |
| DE | 202 16 202 U1 | 12/2002 |
| DE | 101 64 821 B4 | 11/2009 |
| DE | 10 2009 041 237 A1 | 4/2011 |
| DE | 10 2010 014 596 A1 | 10/2011 |
| EP | 1 568 562 A1 | 8/2005 |
| EP | 1 775 190 A2 | 4/2007 |

* cited by examiner

SYSTEM, METHOD AND RAILWAY CARRIAGE FOR THE RAIL-BOUND TRANSPORTATION OF OBJECTS

The present invention relates to a system for the rail-bound transportation of articles, for example for the transporting in and away of material to and from railroad work vehicles, having a plurality of railroad cars which can be coupled together and which each have at least one conveyor track on which the articles are movable along the railroad cars and which is configured such that the conveyor tracks of railroad cars coupled to one another adjoin one another. The present invention furthermore relates to a corresponding method and to a railroad car for use in such a system or method respectively.

Work on railroad tracks is carried out in a rail-bound manner as much as possible since the disruption of the rail traffic and the burden on the environment can thereby be kept small. Railgoing work vehicles such as ballast cleaning machines, foundation rehabilitation machines and the like, but also machines for the removal or for the new production of rail carriageways are used for this purpose. In practically all cases, material has to be transported to the work vehicles and/or has to be transported away from them. For example, with ballast cleaning machines, the waste of old ballast and foundation material thus has to be transported off. With foundation rehabilitation machines and with machines for the new production of rail carriageways, material for the foundation or for the rail carriageway has to be transported away. In addition, with such work vehicles, there may be a need for other materials such as water, fuel, ironware, sleepers and the like.

Whereas the inward transport of the other materials frequently takes place by so-called gantry cranes or optionally not rail-bound at all, that is via road trucks, so-called material conveyor and silo units are available for the transporting in and away of waste, ballast, sand and the like. They are in this respect usually upwardly open railroad cars whose bottoms are equipped with conveyor belts for conveying the named materials. In addition, a transfer conveyor belt is arranged at one end of these railroad cars and the material can be conveyed from car to car, or to the side after outwardly pivoting the transfer conveyor belt, using said transfer conveyor belt.

The use of conveyor belts only at the bottom of the cars is disadvantageous with these known material conveyor and silo units. Substantial friction thereby occurs between the material and the side walls of the car on the conveying and results in a high energy loss and a wear due to abrasion. Large motors are therefore required to drive the conveyor devices. In addition, a contamination not only of the cars, but also of the environment, occurs due to the open construction. A further disadvantage comprises the fact that a segregation of the materials occurs due to the conveying, which is unwanted in materials for the foundation rehabilitation or for the new production of a rail carriageway.

It is the underlying object of the invention to provide a system, a method and a railroad car of the initially named kind which do not have the named disadvantages and which can also generally be used for goods transportation on railroad routes.

In a system in accordance with the invention, this object is satisfied in that transport bodies for the articles are provided which are configured for a movability from car to car along mutually adjoining conveyor tracks or in that the articles are general cargo and themselves form such transport bodies.

In a method in accordance with the invention, the object is satisfied in that the articles are transported by means of transport bodies on the railroad cars or are configured as transport bodies forming general cargo including a device, in particular a machine, satisfying at least one track-related work function, wherein the transport bodies are movable from car to car on the railroad cars along mutually adjoining conveyor tracks.

A railroad car in accordance with the invention for use in a system in accordance with the invention or in a method in accordance with the invention has at least one conveyor track on which articles can be moved along the railroad car, wherein a drive is provided for moving transport bodies along the conveyor tracks.

In accordance with the invention, transport bodies which are moved on the railroad cars are used instead of the transport belts. The transport bodies can be moved on carriageways, roller conveyors, slideways, suspended tracks, overhead tracks, conveyor belts, conveyor chain tracks or other tracks.

It is a substantial advantage of the invention that much less friction occurs on the transportation due to the use of transport bodies. The energy loss is thereby much lower than in the known system. In addition, as good as no segregation of the materials occurs due to the use of transport bodies. The contamination is also considerably smaller with respect to the known system. A contamination of the environment practically does not occur at all. A further advantage comprises the fact that all types of materials, that is in particular also water, ironware, sleepers and fuel can be transported in addition to carriageway material and ballast. These materials can thus equally be transported in or away in a rail-bound manner, such as previously ballast and sand, and indeed also simultaneously in that different transport bodies are filled with different material. All materials can also, if desired, be transported in and/or away from only one side of the machine by the invention.

A further advantage of the invention comprises the possibility of transporting a plurality of transport bodies simultaneously. This considerably increases the throughput with respect to gantry train solutions and with respect to the transportation by means of material conveyor and silo units.

The invention can not only be used for transportation in and away of material to and from railroad work vehicles, but also very generally for the transportation of articles on railroad routes. A substantial advantage also comprises the fact here that the railroad cars can be loaded and unloaded very fast in that the transport bodies for the articles are moved along the mutually adjoining conveyor tracks of the railroad cars. At the starting point of a train in accordance with the invention, the transport bodies previously loaded with the articles are therefore simply moved, for example rolled, onto the railway cars. The conveyor tracks of the railroad cars can be provided with suitable rollers for this purpose. The transport bodies are accordingly unloaded from the railroad cars at the destination of the train. The loading and unloading of the train is therefore possible in a very short time.

There is in addition the possibility that the transport bodies are resorted on the train during the travel of the train to obtain a specific sequence of the transport bodies on the unloading. Only some of the transport bodies can thus, for example, be quickly unloaded at a first location in that these transport bodies are sorted to the unloading end of the train. At a second destination, the subsequently sorted transport bodies can then be unloaded. At the first destination, other transport bodies can also be loaded as replacements for the unloaded transport bodies and can then likewise be sorted to a suitable site of the train during the continued journey. Devices for the time-wise removal of transport bodies from a conveyor track are provided for the resorting. The railroad cars can also have two or more parallel conveyor tracks between which the transport bodies can be exchanged.

The parallel travel paths allow a continuous transport in and/or away of material in that the transport bodies are moved on a travel path to the work vehicle and are filled or unloaded there and are loaded and unloaded on another travel path and are moved away from the work vehicle again. A plurality of transport bodies can thus be moved continuously after one another to and away from the work vehicle to transport material in and/or away.

The transport bodies are preferably movable in both directions on the travel paths. The system is thereby particularly flexible.

The conveyor tracks preferably extend at least substantially horizontally and/or at substantially adjoin one another without steps. A transfer of the transport bodies from railway car to railway car is thus particularly easily possible. The conveyor tracks could also not extend horizontally, that is could form a depression, between the transfer points. It could then be sufficient only to drive the transport bodies at the start and/or at the end of each conveyor track of a railway car. The transport bodies would advance on their own in the meantime due to their mass.

In accordance with a preferred embodiment of the invention, two travel paths are arranged above one another. This has proved to be particularly advantageous, in particular for loading and unloading the transport bodies.

In accordance with a further embodiment of the invention, a device is provided at at least one car for the time-wise removal of a transport body from a travel path or for changing the travel path. The flexibility of the system is thereby further increased. A resorting of the transport bodies and an intermediate storage of individual transport bodies can in particular thereby take place. In accordance with an embodiment, at least one of the transport bodies is provided with caterpillar tracks and is able to move down from the respective conveyor track to the side on the reaching of the destination. This allows an effective unloading of the transported good from the transport body, for example the placing of a point next to the travel track.

In accordance with another aspect of the invention, an apparatus for the machine transfer of transport goods between the car and a work vehicle and/or a loading and/or unloading site is in particular provided at at least one car, in particular to be arranged at a train end. This facilitates the loading and/or unloading of the transport bodies at the work vehicle.

Furthermore, at least one car is preferably equipped with a lateral unloading possibility for the transport bodies. The transport bodies can thereby be removed laterally and replaced with other transport bodies. It is thus possible to replace a transport body filled with waste material with an empty transport body at a suitable site or to replace an empty transport body with another transport body having supply material. It is equally possible to replace a transport body filled with waste with a transport body filled with supply material. The unloading possibility can in this respect also comprise only the fact that the car provides an access possibility for a loader and unloader such as an excavator or a lifting vehicle.

In accordance with a particularly preferred aspect, a device is provided at at least one care for placing down and/or picking up transport bodies onto and from the travel track respectively. This allows a very fast loading and/or unloading of a train in accordance with the invention. This is in particular important with a train for supplying and/or for the waste disposal of a railway work vehicle. A train which has been worked through can, for example, be traveled to a remote site of the railroad network where new transport bodies have previously been stored on the travel track. First, the new transport bodies are taken up from the travel track via a suitable device at a car present at the end of the train and are moved to a conveyor track of the train. The transport bodies which have been worked through are then moved down by another conveyor track of the train and are placed on the travel track via the named device. The train can now travel back to the railway work vehicle with the new transport containers and can again supply and them or remove their waste. It is in this respect also possible to stack the transport bodies on the track to reduce the required track length and thus to reduce the typically equally long construction site equipping area.

A particularly favorable work operation is made possible in that some of the existing railroad cars remain at the machine, whereas the remaining railroad cars commute between the construction site and the material supply site. Only during the relative short period of the material exchange do the commuting cars always remain at the cars located at the machine to which cars they are coupled during this period. On a use of a screw coupling, the machine has to stop briefly during the coupling and decoupling. An apparatus can, however, also be provided which continuously detects the buffer pressure and aborts the material exchange in a controlled manner if the buffer pressure falls below a threshold value. Such an apparatus can make the above-mentioned coupling and decoupling superfluous.

The transport bodies are preferably movable from railroad car to railroad car without additional loading means such as cranes. The transport bodies are furthermore preferably directly movable from railroad car to railroad car on the conveyor tracks. In other words, only the conveyor tracks themselves serve for the transfer of the transport bodies from car to car in that e.g. the transport bodies change from a section of a conveyor track located at the end of the car to the conveyor track of the next car by means of their own drive or in that such a section conveys the transport bodies actively onto the conveyor track of the next car. The complex and expensive provision of gantry cranes or the like can thus be avoided.

At least one transport body can be configured as an open or closed container. Open containers are simple to load, whereas closed containers provide good protection for the articles to be transported. Such containers can thus take up liquids such as water or fuel, bulk goods such as ballast, or also components such as ironware or sleepers depending on the design and can convey them by moving on the conveyor tracks to or away from a railroad work vehicle or generally to or way from a railroad work site. At least one transport body can also be configured as a board-like support in order thus to allow a transportation of heavy and bulky goods such as rails or concrete slabs. A plurality of different types of materials, machines and components can thus be transported to and from a railroad work site by means of an arrangement of differently designed transport bodies in a rail-bound manner, whereby a particularly effective working at the track is possible.

It is, however, not necessarily required to provide a container or support for every load material to be transported. A piece of load material to be transported on the conveyor tracks can rather itself form a transport body. In this respect, at least one transport body can be configured as general cargo to be transported on the conveyor tracks. In other words, the conveyor tracks can be specifically designed for a transportation of transport bodies in the form or specific heavy and/or bulky components—also without containers or supports. In this manner, rails, points, concrete slabs and the like can be moved to or away from the desired work site in a rail-bound manner in that they are e.g. directly conveyed on roller tracks of the respective railroad car.

At least one transport body can furthermore be configured as a device, in particular a machine, satisfying at least one rail-bound work function. The conveyor tracks can thus be used to convey heavy work apparatus of different kinds in a simple manner to a railroad work site located at the travel track. Not only a machine such as an excavator or a lifting vehicle can be provided as a device satisfying a rail-bound working function, but also a measuring or inspection apparatus, a monitoring unit or a complex device such as a mobile filling station. A transport body in the sense of the invention can therefore not only be configured for taking up or supporting a machine, but can also itself be configured as a machine, a measuring device or the like. The machine can in this respect also be formed by combining two or more transport bodies. In this manner, measurements or construction work can be carried out particularly effectively since the machine does not have to be brought in and taken out again in a road-bound manner or by means of separate railroad cars.

In accordance with an aspect of the invention, at least one transport body is configured for passenger transportation. Persons, in particular workers, can thus be transported along railroad vehicles.

The transport bodies are preferably adapted to the transport on the conveyor tracks or vice versa with respect to their outer dimensions, their weight and/or their surface properties. In other words, the transport bodies and the conveyor tracks are matched to one another in order thus to allow an effective conveying, in particular without additional loading means such as cranes. The width and/or the maximum load pressure of the conveyor tracks can in particular already be selected in the design of a system in accordance with the invention such that the transport of machines required at a railroad work site or large components such as rails, concrete slabs or even points is possible on them.

A transport body in the sense of the invention is thus to be considered as any piece of load material which is specifically configured for a movability on the conveyor tracks due to the property of the conveyor tracks.

To allow a transportation which is as effective as possible, the transport bodies can have special roll-off surfaces for rollers of roller tracks at one or more of their sides. The transport bodies could furthermore be provided with a substantially completely smooth bottom. The transport body can thus advantageously be moved and/or guided. The roll-off surfaces are in this respect in particular configured such that a sufficient frictional resistance results between the rollers of a roller track and the transport body to avoid or reduce a slipping of the rollers. A configuration of the roll-off surface for a reduction of the load of the rollers of a roller track and thus of their wear, in particular on the transition of the transport body from one roller to the next, is advantageous. A ramp or a rounded portion can be provided at the end of the roll-off surface, for example.

The provision of a roll-off surface at the upper side of the transport body can serve to improve a rolling off of a roller at the upper side of the transport body. The tipping out of the transport body on the transition of the transport body from one railroad vehicle to the other can be prevented with such a roller, for example.

Roll-off surfaces at the side of the transport body serve for the lateral guidance via rollers of roller tracks. The roll-off surfaces can also be located in a specific groove or at a web at the lower side of the transport body. In addition to an existing side guide, a further guide can additionally be provided at the conveyor tracks which, in a similar manner to a crash barrier, prevents the transport body from leaving the conveyor track even on a failure of the side guide.

To move the transport bodies along the conveyor tracks, a drive, for example driven rollers, can be provided at them. A drive can, however, also be provided at the transport bodies themselves or at another point of the railroad cars, for example to the side of the conveyor tracks. In accordance with an embodiment of the invention, the transport bodies have a driver-less drive, i.e. the driven movement of the transport body takes place in an automatically controlled or remote controlled manner. It is then not necessary to provide the transport bodies with crew. A drive at the railroad car has the advantage that the transport bodies can be configured very simply, for example as simple transport boxes. In an embodiment of the invention, a railroad car has a drive for moving the transport bodies along the conveyor tracks, wherein the transport bodies themselves do not have any drive of their own.

The drives are preferably configured such that a cornering of the transport bodies can be produced with them corresponding to the track arc of the travel track and/or such that a movement of the transport bodies is also possible at gradients and cambers of the track. It is thereby possible to move the transport bodies on any desired travel route, for example to sort them.

On a drive of the transport bodies by means of rollers, all existing rollers can be driven, for example by a central drive, or only some of the rollers can be driven. E.g. at least two rollers located behind one another in the direction of travel can be driven by respective individual drives or by a common drive. Two respective rollers disposed opposite one another with respect to the conveyor track can also be equipped with individual drives or with a common drive. In the last-named variant, a differential transmission can be provided in the drivetrain which connects the motor of the drive to the two rollers. This differential transmission can be configured as a self-locking differential or as an external locking differential. An apparatus can furthermore be provided for the so-called torque vectoring. Such apparatus can assist a rotary movement or pivot movement of the transport bodies at the transition from one car to the next car. Such rotary movements can in particular be helpful when the railroad cars stand in a track arc. A pivot movement of the transport bodies can also be initiated by a differential speed of oppositely disposed rollers, preferably at the first or last roller pair of the respective car. The degree of the pivot movement can in this respect be determined by sensors at the ends of a fixedly coupled car group. Together with the path of the car group covered on the track, the kink angle between the cars can be estimated, and indeed also with such cars at which no sensor is attached. The determination of the individual kink angles preferably takes place in an automated manner.

The drive of the rollers preferably takes place electrically, e.g. by means of an electric motor. A switched reluctance motor, also called an SRM, is preferably used. Such motors are characterized by a high robustness and a simple construction. Furthermore the torque-speed characteristic is easily suitable for the present invention and the efficiency is sufficiently high over a large speed range. An inverter can also be provided which is preferably arranged close to the motor, e.g. directly in the associated motor housing.

The rotary movement of the output shaft of the electric motor can in this respect be transmitted directly to the rollers or with the interposition of a transmission. Alternatively, the drive of the rollers can also be effected hydraulically, pneumatically or mechanically. The arrangement of conveyor tracks and transport bodies can also be configured as a magnetic suspended track.

A drive by means of rollers can be configured such that a recovery of energy (recuperation) is possible, e.g. on braking a transport body or on the operation of a roller track on a downward incline.

The operating state of the roller drive and/or of its components can be detracted periodically and/or continuously by a suitable device. This device can be fixedly installed or be provided manually. The provision can also take place in an automated manner.

At least one roller of the roller drive can additionally be equipped with a brake device. An independent movement of the transport bodies can thereby be prevented—e.g. on a disturbance of the roller drive. The brake device is preferably configured such that it fails in the direction of the safe state. The brake device is preferably actuated mechanically and is released electrically, pneumatically, hydraulically or mechanically. An automatically acting brake can also be provided which is preferably equipped with an emergency release. Alternatively or additionally, an apparatus for restricting the maximum speed of the transport bodies can be integrated into the roller drive. Furthermore, the roller drive can comprise an apparatus which prevents the movement of the transport body in a specific—preferably selectable—direction. The direction of effect of this apparatus can be reversed or completely cancelled manually or by remote control.

At least one of the rollers of the roller drive can also be provided with an apparatus for detecting the rotary direction of the angle of rotation, the speed and/or the angular acceleration of the roller. The apparatus can output a corresponding signal with reference to which the slipping or blocking of rollers of the roller drive can be recognized.

The rollers of the roller drive can comprise a solid rubber binder. Alternatively, a pneumatic tire binder can also be provided. Depending on the application, the rollers can, however, also be configured as steel rollers. If the rollers are to be designed as solid rubber rollers, the running surface can have a tread for achieving a better load distribution, e.g. a barrel tread. The stiffness of individual rollers designed as solid rubber rollers can furthermore be influenced by at least one longitudinal and/or transverse groove. The roller can furthermore be equipped with a tread similar to an automobile tire tread. At least one roller can also be composed of a plurality of individual rollers.

To achieve a uniform load by the transport bodies, an apparatus can be provided which effect a so-called load balancing by twisting.

The drive can generally also be realized by spindles, chains or wires instead of via rollers. In addition, a shape-matched drive, e.g. via at least one hydraulic cylinder, can be provided instead of a friction locking drive.

The transport bodies can further preferably be movable singly and/or in groups and/or together. The flexibility of the system is thus further increased. It is inter alia possible with upward gradients to move fewer than all the transport bodies simultaneously to keep the required performance and the required energy effort small. The common movability allows a fast loading and/or unloading. The individual movement possibility facilitates a resorting of the transport bodies and increases the flexibility of the system overall.

The transport bodies can be couplable to one another mechanically and/or by corresponding control in accordance with a further embodiment of the invention. Two or more transport bodies can thereby be moved together in a simple manner.

In accordance with a further embodiment of the invention, the transport bodies can be latched with respect to a conveyor track or with respect to the railroad car for transportation. It can hereby be prevented that the transport bodies move on their own during the travel. A latching can e.g. be realized by adjustable pins at the car which engage into corresponding cut-outs of the transport body. Depending on the application, the actuation of the latching can take place automatically or by remote control. A monitoring apparatus can also be provided for the automatic determination of the latching state.

In accordance with a further embodiment of the invention, the transport bodies are provided with a machine-readable code. The loading and/or unloading procedure can thereby be automated. A remote control of the loading and/or unloading of the transport bodies and of the movement of the transport bodies is also possible in accordance with a further embodiment of the invention Data carriers can also be attached to the transport bodies which can be written and read by a writing/reading apparatus at the car. Furthermore, a data transfer system can be provided which allows an exchange of information between different cars and/or the machine. The information can relate e.g. to the contents of the transport bodies or to the control of the machine.

Means can furthermore be provided for detecting the position of the transport bodies with respect to the conveyor track. In particular mechanical, optical, magnetic and/or inductive detectors can be arranged at the conveyor tracks or at another site at the railroad car for detecting the position. Such a position detection can e.g. facilitate a latching of the transport bodies as described above.

In accordance with a further embodiment of the invention, a warning device is provided which warns an operator of the system of approaching dangers resulting from the roller track operation and/or from the train operation on one or more counter-tracks, preferably acoustically, optically, by a sensor and/or mechanically.

The railroad cars can also be configured with an additional loading and/or conveying possibility for goods such as liquids or gases, in particular with mutually couplable pipes. A railroad work vehicle can thus, for example, be supplied with required water or fuel or have waste water disposed of.

Individual cars or groups of cars can also be provided with additional devices for a plurality of cars or for all cars in accordance with the invention such as a current supply device, an inverter, a brake device and the like. The corresponding supply of a train or of a part thereof can thereby be ensured in an inexpensive manner by one or more individual cars. In addition, at least one car can have a propulsion drive for traveling on a track. A locomotive can thereby become superfluous.

In accordance with a preferred embodiment of the invention, two or more railroad cars can be rigidly coupled to one another. It is thereby possible to dispense with devices such as buffers between the cars. The cars can thereby also be coupled to one another particularly tightly, whereby the total length of the train can be kept smaller.

The individual cars are preferably designed as short as possible to keep the kink angle in a track arc small. Two-axle cars are therefore preferably used as railroad cars. Alternatively, the cars can also form an articulated train with Jacobs bogies. The cars can, however, generally also have bogies with two, three or four axles.

At least one railroad car can be designed such that the transport bodies can change from an upper transportation level to a lower transportation level or vice versa. In this respect, the energy required for raising the transport body is buffered in order thus to minimize the load of the energy supply and/or to accelerate the lifting procedure. Furthermore, the potential energy which is released on the lowering of the transport body can be recovered and be provided for other work as required. The buffering of the energy can take place mechanically, electrically, pneumatically, hydraulically or chemically. Provided that the energy storage takes place in a pneumatic manner, the force displacement characteristic of the pneumatic store can be adapted to the characteristic required for the lift by a transmission. The energy content of the store can thereby be completely utilized, e.g. without restriction losses. In addition, the potential energy of the transport body can also be completely transferred into the pneumatic store on the change from the upper to the lower transportation level.

An apparatus for the temporary removal of a section of the upper roller track can allow a passing of the transport body onto the lower roller track. The lower roller track is in this respect also usable when the section of the upper roller track has been removed. Alternatively, a section of the upper roller track can also be lowered together with the transport body to transfer it to the lower roller track. This design allows a particularly simple structure.

The transport bodies can be moved in both directions or in opposite directions respectively on the conveyor tracks for loading and/or unloading railroad work vehicles or for resorting. The loading and/or the unloading or the resorting can thus take place particularly fast. In this respect, the supply in and out of material to and from railroad work vehicles can take place simultaneously and also on the same side of the work vehicle. The supply and waste disposal of the railroad work vehicle is further accelerated by the simultaneous supply and removal. The supply and removal on the same side has the advantage that, for example, points in the vicinity of the work vehicle can be kept free. The impairment of the rail traffic can thereby be reduced overall.

Different materials can moreover be supplied and/or removed simultaneously by the use of transport bodies, which is not possible or is only possible with great restrictions on a use of the known material conveyor and silo units.

The system in accordance with the invention particularly preferably comprises two trains with cars which can be combined to exchange their transport bodies between one another. The downtimes of railroad work vehicles can thereby be kept very small since the transport bodies can be exchanged within a few minutes between a train which has been worked through and a train which has not been worked through. After an exchange of the transport bodies, the second train can be moved away from the first train, which is located at the work vehicle, and can be emptied and/or loaded at any desired site. It is thereby not necessary to provide storage facilities in direct proximity to the work vehicle.

The railroad cars in accordance with the invention can be configured as open or have a top and/or side walls. If a top is provided, in particular open transport bodies are protected from weather effects. In addition, the required electrical insulation with respect to a traction current line is ensured. Weather influences can furthermore be kept out by side walls.

In addition, the design of the railroad cars as two-axle cars is particularly preferred. They are thereby particularly light and inexpensive and can also be produced as short cars unlike the known material conveyor and silo units. The railroad cars in accordance with the invention can thus also be transported simply and inexpensively on land and on water in order to move them to sites where no railroad network is yet present.

The railroad car can additionally be equipped with a travel drive for moving on a track. A locomotive can thereby become superfluous.

The invention also relates to a transport body for the transportation of goods on rail vehicles which is configured for traveling on a conveyor track which is provided on one or more railroad cars.

In accordance with an embodiment of the invention, the transport body is configured for moving from railroad cars to railroad cars on conveyor tracks which are provided adjoining one another on the railroad cars.

The transport body can be drive-less or can be provided with a drive for moving on the conveyor track depending on the application.

Furthermore, the transport body can be configured with a roll-off track for rolling off rollers of a roller track, in particular having a roll-off track with a suitable frictional resistance for avoiding a slipping of the rollers of the roller track.

In accordance with a preferred embodiment of the invention, the transport body has a roll-off track at its upper side.

The transport body can also have at least one roll-off track at a side or in a groove at the lower side for the side guidance of the transport body.

An embodiment of the invention is represented in the drawing and will be described in the following. There are shown, schematically in each case FIG. 1 a railroad car in accordance with the invention; and FIG. 2 two combined trains of a plurality of railroad cars in accordance with the invention.

The railroad car 1 shown in FIG. 1 comprises a lower frame 2 having two wheelsets 3. Furthermore, an upper frame 4 is provided which is connected via vertical struts 5 to the lower frame 2. A respective conveyor track 6, 7 on which transport bodies 8 can be moved is configured on the lower frame 2 and on the upper frame 4. The transport bodies 8 can be closed boxes, open transport bodies such as containers or pallets, or machines which are provided at their lower side with wheels 9 which roll off on the conveyor track 6 or on the conveyor track 7.

The transport bodies 8 can be automatically movable on the conveyor track 6, 7. The transport bodies 8 are provided with a machine-readable code 10 for this purpose. The movement can in this respect also take place by remote control.

Figure 2:
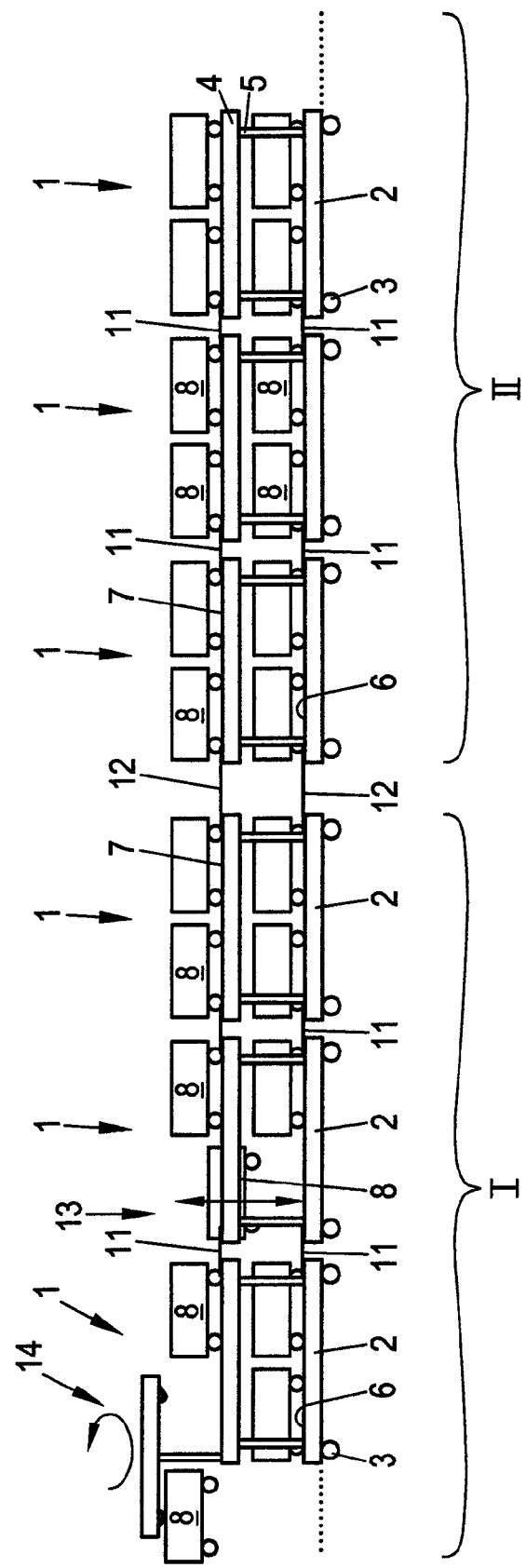

As shown in FIG. 2, a respective plurality of cars 1 are combined to form a train I, II. The lower convey tracks 6 and the upper conveyor tracks 7 of the cars 1 each adjoin one another without a step and extend horizontally. Conveyor track connections 11 are provided between the cars 1 for this purpose. Such conveyor track connections 12 can also be provided between the trains I, II. In this manner, the transport bodies 8 can also be exchanged between two trains. On use of conveyor tracks 6, 7 having rollers or the like and having transport bodies without wheels 9, such connections 11, 12 can also be dispensed with.

As is likewise shown in FIG. 2, at least one of the cars 1 can be equipped with a change device 13 between the conveyor tracks 6, 7. The transport bodies 8 can thereby be bought from the conveyor track 6 or 7 to the other conveyor track 7 or 6. This allows a resorting or an intermediate storage of transport bodies 8. The transport bodies can preferably be moved in both directions on both conveyor tracks 6, 7. It is likewise shown in FIG. 2 that a car 1 arranged at one end of a train I, II can be equipped with an automatic loading and/or unloading device 14. This loading and/or unloading device allows a material exchange between the transport bodies 8 and a railroad work vehicle, not shown here, or an exchange of transport bodies 8 between the car 1 and a storage site, in particular on the travel track.

The possibility is likewise not shown of providing at least one of the cars 1 with a lateral loading and unloading possibility for the transport bodies 8. The transport bodies 8 can thereby be removed from the car 1 and replaced with other transport bodies, for example to replace transport bodies 8 filled with waste with empty transport bodies or to replace empty transport bodies 8 with transport bodies having new material.

REFERENCE NUMERAL LIST 1 railroad car
2 lower frame
3 wheelset
4 upper frame
5 vertical strut
6 lower conveyor track
7 upper conveyor track
8 transport body
9 wheel
10 code
11 conveyor track connection
12 conveyor track connection
13 conveyor track exchange device
14 automatic loading and unloading device
I first train
II second train

The invention claimed is:

1. A method for the rail-bound transportation in and away of material to and from railroad work vehicles, wherein the material is transported by means of a plurality of railroad cars (1) which can be coupled together, wherein the railroad cars (1) each have at least one conveyor track (6, 7) on which the material is movable along the railroad car (1) and which is configured such that the conveyor tracks (6, 7) of railroad cars (1) which are coupled together adjoin one another, wherein the material is transported on the railroad cars (1) by means of transport containers (8), wherein the transport containers (8) are moved on the railroad cars (1) from a first railroad car (1) to a second railroad car (1) along mutually adjoining conveyor tracks (6, 7), wherein the material comprises at least two different materials, wherein the different materials are supplied to a railroad work vehicle simultaneously by means of the transport containers (8) or the different materials are removed from a railroad work vehicle simultaneously by means of the transport containers (8), wherein at least one of the different materials is a liquid or a granular material that substantially takes the shape of the transport container in which the material is contained.

2. The method in accordance with claim 1, wherein the transport containers (8) are moved along the conveyor tracks (6, 7) for loading or unloading the railroad cars (1) or for resorting the transport containers (8) on the railroad cars (1); or wherein the transport containers (8) are moved along the conveyor tracks (6, 7) by a drive present at at least one of the railroad cars (1) or by a separate drive.

3. The method in accordance with claim 1, wherein the transport containers (8) are moved along at least two mutually parallel conveyor tracks (6, 7) which are provided at at least some of the railroad cars (1), wherein the transport containers (8) are moved on the conveyor tracks (6, 7) in both directions or in opposite directions respectively; or wherein transport containers (8) are resorted by time-wise removal from a conveyor track (6, 7) or by an exchange between the conveyor tracks (6, 7) on the railroad cars (1).

4. The method in accordance with claim 1, wherein the moving or the loading and unloading of the transport containers (8) takes place by remote control; or wherein the transport containers (8) are latched with respect to a conveyor track (6, 7) or with respect to a railroad car (1) for the transportation.

5. The method in accordance with claim 1, wherein a supply and removal of material to or from a railroad work vehicle takes place simultaneously.

6. The method in accordance with claim 1, wherein the material is transported in on a conveyor track (6 or 7) to a railroad work vehicle and is transported away on another conveyor track (6 or 7) from a railroad work vehicle; or wherein the transport containers (8) are moved on the one conveyor track (6 or 7) while full and on the other conveyor track (6 or 7) while empty; or wherein transport containers (8) are removed laterally from the railroad cars (1) for replacement; or wherein a replacement takes place along the direction of travel of the train with transport containers (8) supported on the travel track; or wherein, after a supply or waste disposal of a railroad work vehicle using a train (I) having railroad cars (1), a second train (II) having railroad cars (1) is traveled in; and wherein then the transport containers (8) of the first train (I) are replaced with the transport containers (8) of the second train (II) by moving the transport containers (8) along the conveyor tracks (6, 7).

* * * * *